United States Patent
Geller et al.

(10) Patent No.: US 10,809,904 B2
(45) Date of Patent: Oct. 20, 2020

(54) INTERACTIVE TIME RANGE SELECTOR

(71) Applicant: SAP SE, Walldorf (DE)

(72) Inventors: Nicole Geller, Saarbrücken (DE);
Christian Scheirmann, Kelkheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/865,340

(22) Filed: Jan. 9, 2018

(65) Prior Publication Data
US 2019/0212904 A1    Jul. 11, 2019

(51) Int. Cl.
*G06F 3/0484* (2013.01)
*G06F 3/0486* (2013.01)
*G06F 3/0485* (2013.01)

(52) U.S. Cl.
CPC ........ *G06F 3/04847* (2013.01); *G06F 3/0485* (2013.01); *G06F 3/0486* (2013.01); *G06F 3/04842* (2013.01); *G06F 2203/04806* (2013.01)

(58) Field of Classification Search
CPC .......................... G06F 3/04847; G06Q 10/109
See application file for complete search history.

(56) References Cited

U.S. PATENT DOCUMENTS

| | | | | |
|---|---|---|---|---|
| 10,109,086 | B1* | 10/2018 | Bakshi | G06T 13/80 |
| 2004/0125137 | A1* | 7/2004 | Stata | G06Q 10/109 |
| | | | | 715/764 |
| 2008/0115075 | A1* | 5/2008 | Ryan | G06F 3/0486 |
| | | | | 715/769 |
| 2008/0184167 | A1* | 7/2008 | Berrill | G06F 3/04847 |
| | | | | 715/833 |
| 2010/0185984 | A1* | 7/2010 | Wright | G06T 11/206 |
| | | | | 715/833 |
| 2011/0265032 | A1* | 10/2011 | Weir | G06F 3/04847 |
| | | | | 715/810 |
| 2012/0185470 | A1* | 7/2012 | Ullman | G06Q 30/0625 |
| | | | | 707/723 |
| 2012/0215903 | A1* | 8/2012 | Fleischman | G06Q 30/0201 |
| | | | | 709/224 |
| 2014/0067795 | A1* | 3/2014 | Ullman | G06Q 30/0625 |
| | | | | 707/722 |

(Continued)

OTHER PUBLICATIONS

Chris7, Complex Sliding range selector, and arrays, Nov. 2, 2017, .bubble, pp. 1-2 (Year: 2017).*

(Continued)

*Primary Examiner* — Justin S Lee
(74) *Attorney, Agent, or Firm* — Buckley, Maschoff & Talwalkar LLC

(57) ABSTRACT

Provided are systems and methods for displaying visual components that can be manipulated via a user interface. In one example, a method includes one or more of displaying, via a user interface, a time bar comprising a row of time units arranged in sequential order from one end of the time bar to another, displaying a pair of time selectors at separate positions on the time bar, each of the time selectors being independently movable on the time bar with respect to one another, selecting a range of time from the time bar based on one or more time units that are included on the time bar between the positions of the pair of time selectors, and processing an operation of a computing system based on the selected range of time on the time bar between the positions of the pair of time selectors.

22 Claims, 12 Drawing Sheets

(56) References Cited

U.S. PATENT DOCUMENTS

2014/0196025 A1* 7/2014 Corinella ............. H04W 76/10
717/178
2014/0282252 A1* 9/2014 Edwards ............ G06F 3/04847
715/833
2015/0213631 A1* 7/2015 Vander Broek ....... G06T 11/206
345/589

OTHER PUBLICATIONS

Vitaly Friedman, Designing The Perfect Slider, Jul. 19, 2017, SmashingMagazine, pp. 1-63 (Year: 2017).*

* cited by examiner

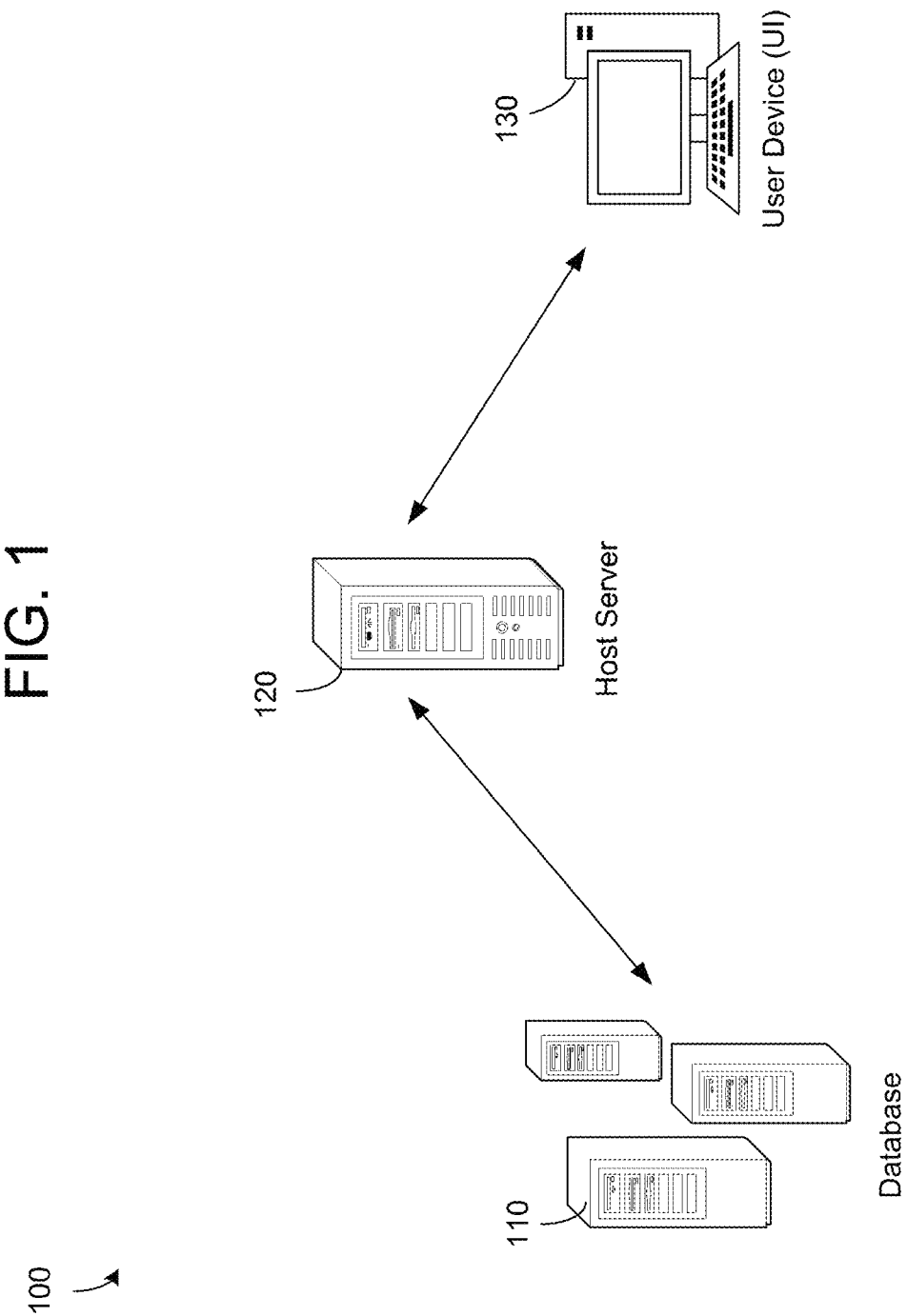

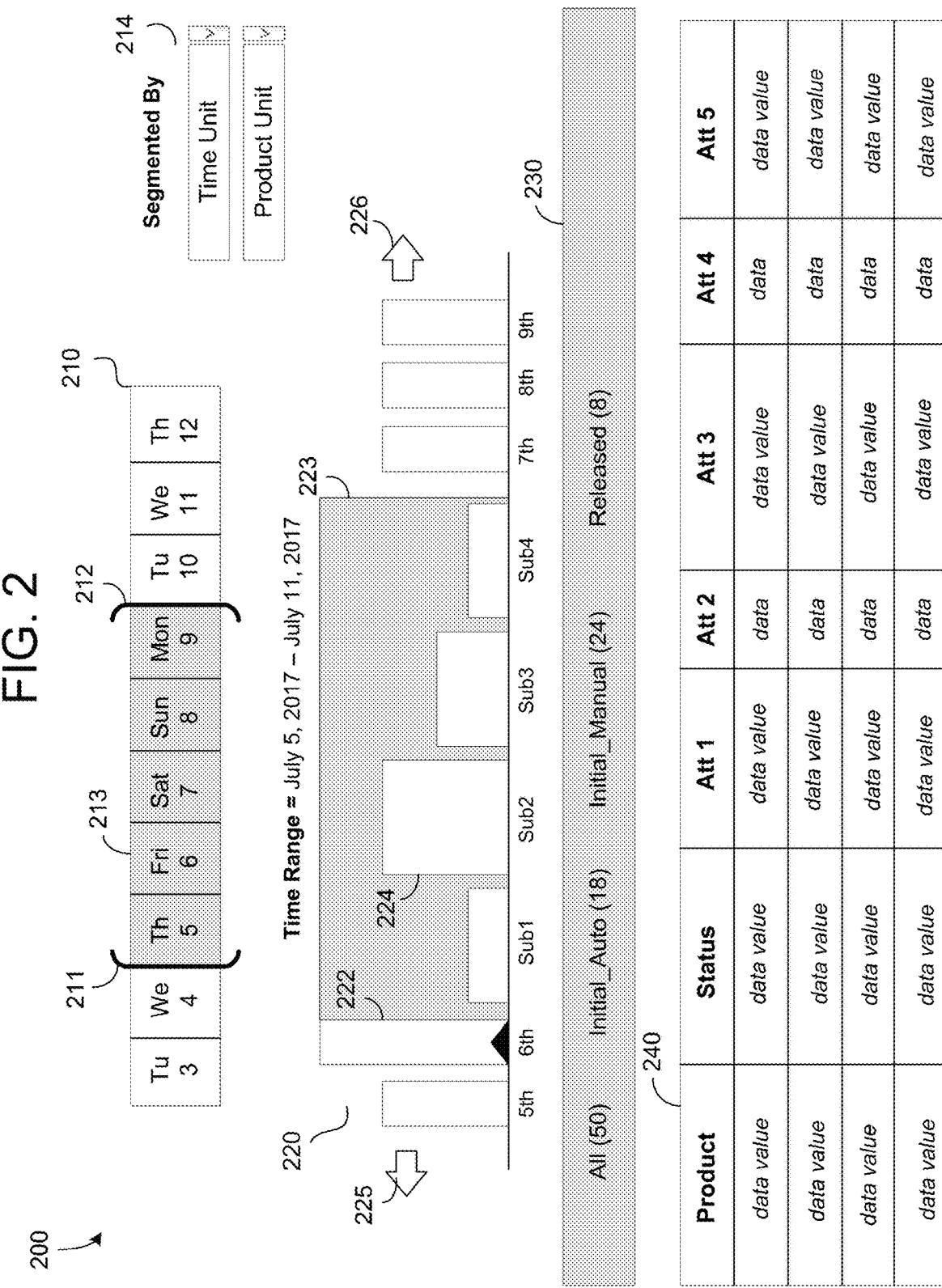

FIG. 4C (1st Level)

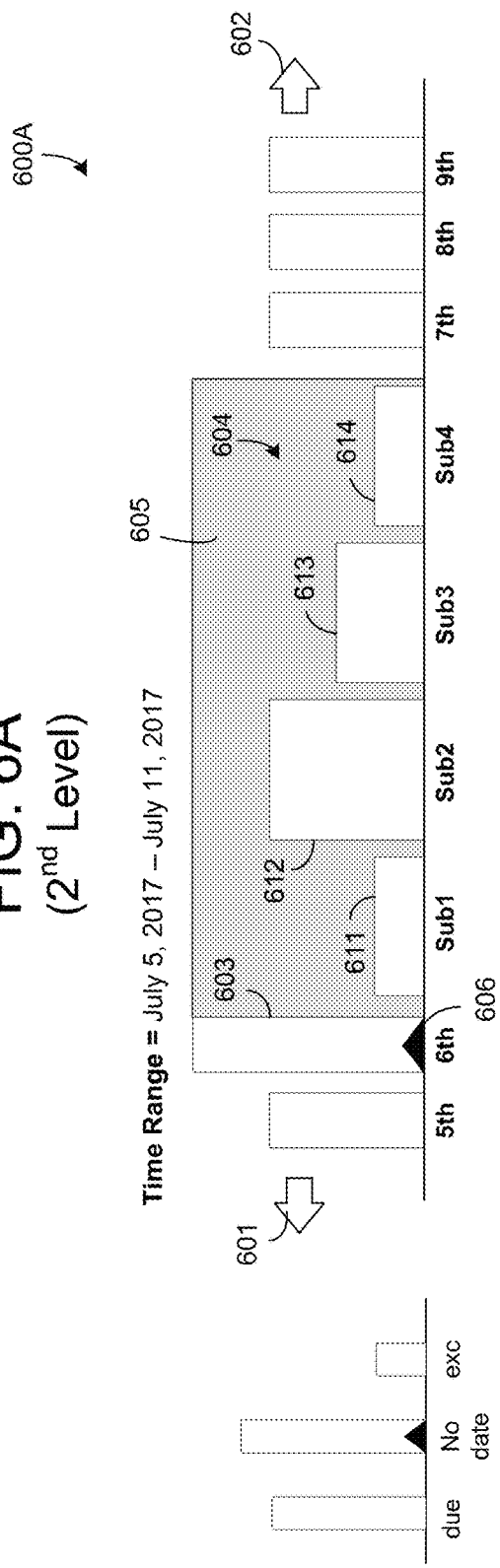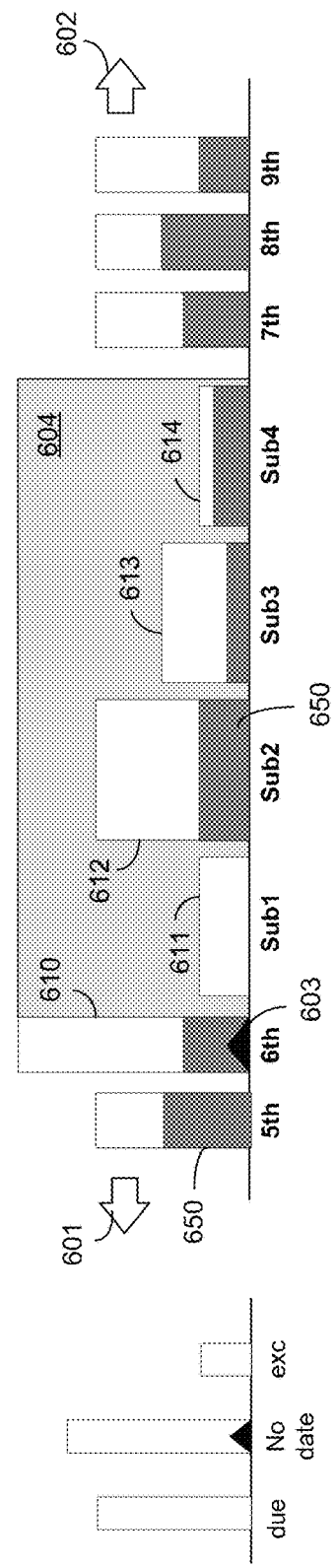

(3rd Level)

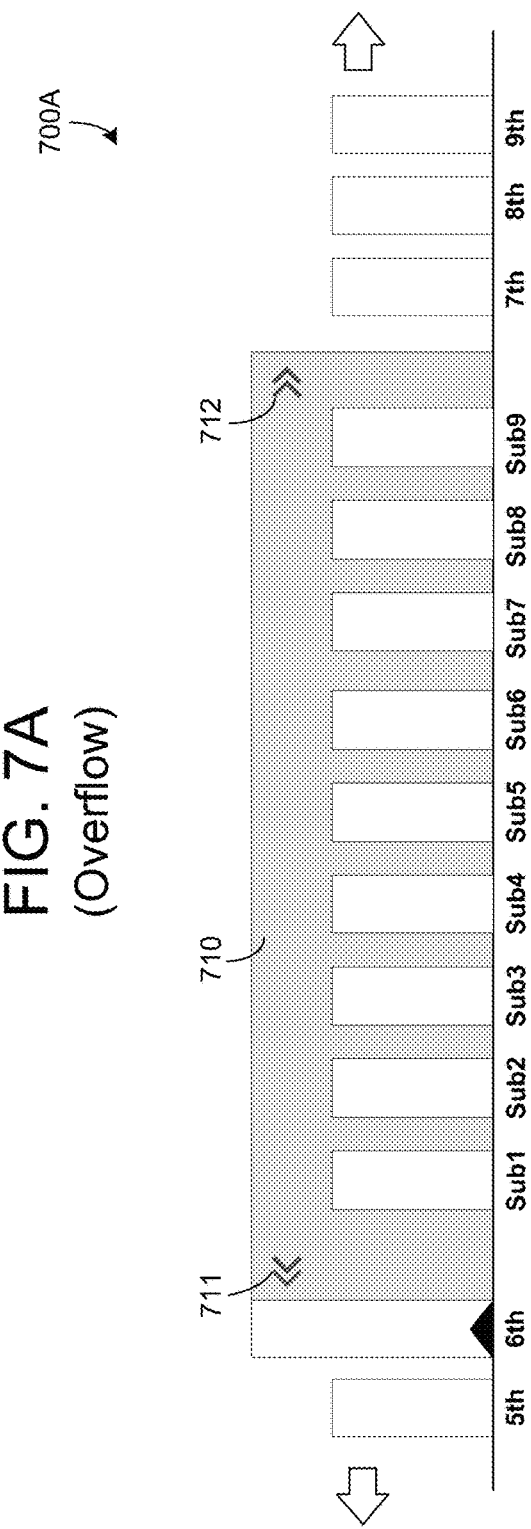
FIG. 7A (Overflow)
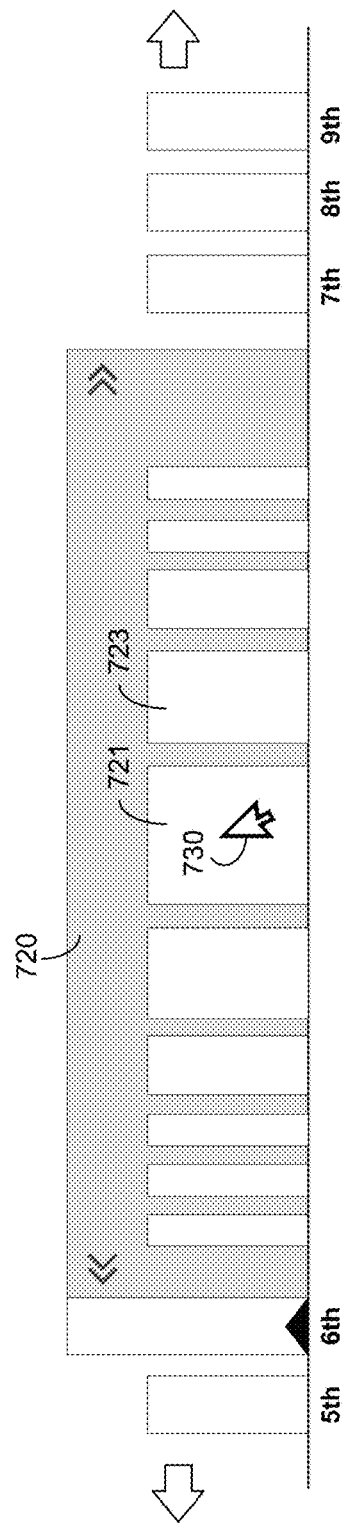
FIG. 7B (Zoom)

810 — Displaying an Interactive Bar Chart including a Plurality of Bars Representing a Plurality Items 820 — Detecting a Selection of a Bar among the Plurality of Bars corresponding to an Item from among the Plurality of Items 830 — Collapsing a Display of the Remaining Bars from among the Plurality of Bars corresponding to Unselected Items 840 — Launching an Internal Bar Chart associated with the Selected Bar including Additional Bars corresponding to Attributes of the Selected Item

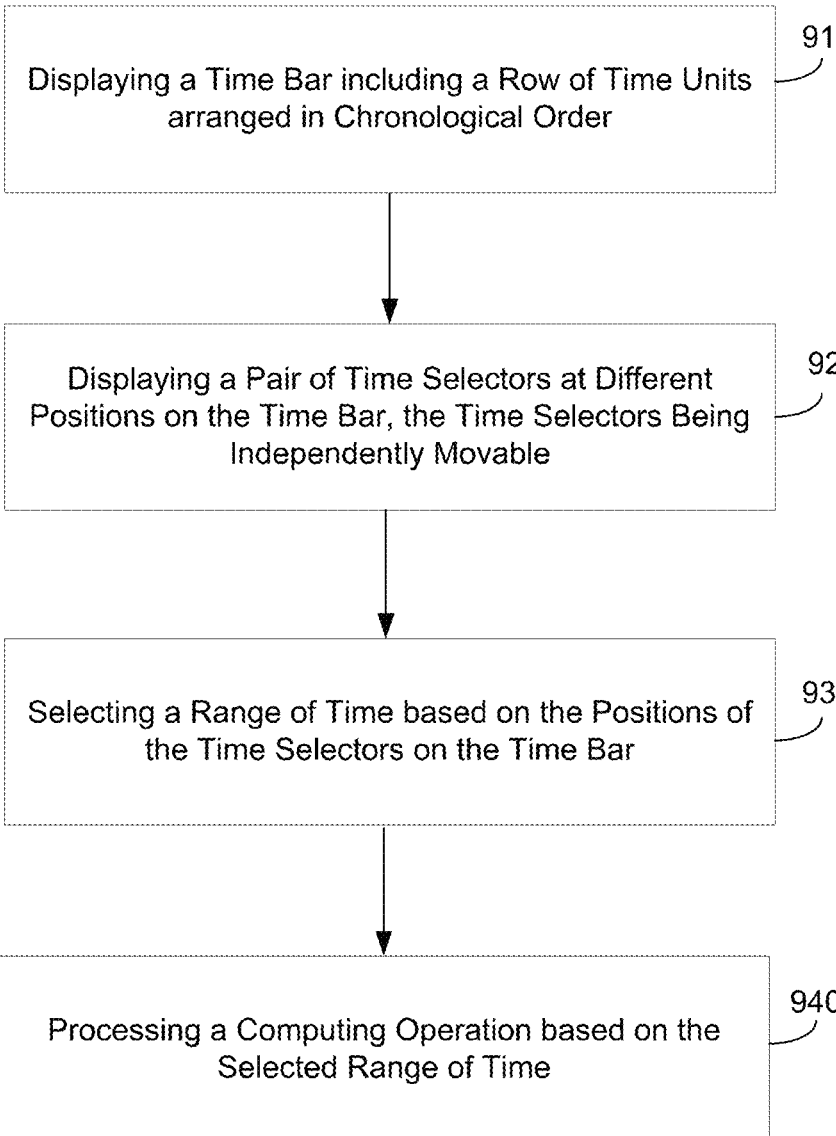

INTERACTIVE TIME RANGE SELECTOR

BACKGROUND

Graphic visualizations are often used for displaying images, diagrams, animations, and the like, to communicate a meaningful understanding of data through visual imagery. Visualizations can be in the form of plots, graphs, charts, diagrams, drawings, and the like, and can be used to represent underlying data in some form that can be understood by a viewer. Some data types can be more difficult to efficiently display through visualizations. For example, hierarchical data is a data model in which data is organized in a hierarchical format (e.g., a tree structure, etc.) Many current databases store records in the form of a hierarchical database model. In this model, records and their attributes may be connected to one another through links. Each record may include a collection of fields and each field may include one or more values. This type of data structure is beneficial because it is simple and rigid and can be traversed quickly with a processing device, etc.

However, databases are often tasked with storing thousands or even millions of records where each record includes multiple fields and values of data. As a result, visually representing complex scenarios of hierarchically linked information can be a difficult task, if not impractical. Furthermore, identifying context from within thousands of database records can also be difficult. Accordingly, what is needed is technology that can provide visualizations of hierarchical data in a format that is understandable and efficient for viewing complex scenarios.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1 is a diagram illustrating a computing environment for accessing database records in accordance with an example embodiment.

FIG. 2 is a diagram illustrating a user interface for visualizing database content in accordance with an example embodiment.

FIGS. 4A-4F are diagrams illustrating features of the time range selector in accordance with example embodiments.

FIGS. 6A-6C are diagrams illustrating drilling down into levels of the interactive bar chart in accordance with example embodiments.

FIGS. 7A-7B are diagrams illustrating additional characteristics of the interactive bar chart in accordance with example embodiments.

FIG. 8 is a diagram illustrating a method of managing an interactive bar chart in accordance with an example embodiment.

FIG. 9 is a diagram illustrating a method of managing a time range selector in accordance with an example embodiment.

Figure 3A:
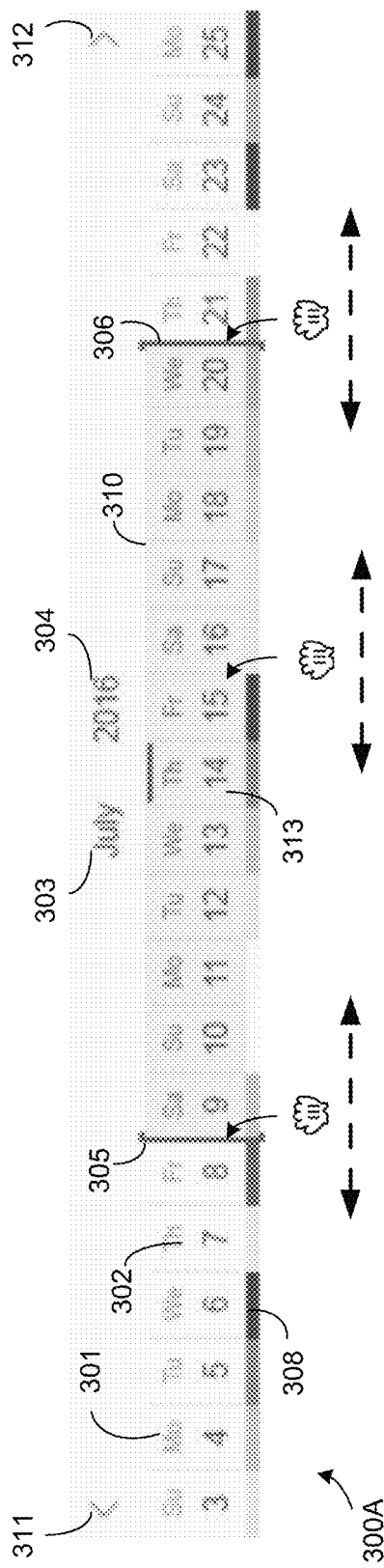
FIGS. 3A and 3B are diagrams illustrating a time range selector in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system that displays and manages interactive visual components that can be manipulated by a user to control access and management of underlying database content (e.g., database records, tables, etc.). The visual components can be displayed individually or as a combination of controls within a user interface such as through a dashboard. The visual components can be manipulated via input commands (e.g., mouse, keyboard, touch screen, speech recognition, motion, etc.) detected via the user interface. In one example, the visual components provide the user with the ability to hierarchically drill down into data while a view of the user interface remains in-place on the screen. In contrast, a related hierarchical selection box or decision tree typically drops down to reveal additional elements therefore requiring additional screen space and the view of the interface to be moved via controls. Furthermore, the visual components also provide the user with the ability to view information at different frames of time while maintaining a placeholder of a current time allowing the user to interrogate underlying data in an efficient manner.

According to various embodiments, an interactive time range selector is provided which can be manipulated through commands via the user interface to define and select a range of time. The selected range of time can be used by the system to fill-in additional visual components of the user interface. For example, the time range selector may define a period of time over which data records from an underlying database are to be analyzed in some meaningful way. The time range selector can be used to specify a period of time such as hours, days, weeks, months, years, and the like, using a pair of selectors (also referred to herein as grippers) which can select a starting time unit and an ending time unit with all time units in between being part of the selected range of time. Furthermore, the granularity of the time units within the time range selector can be modified via single action while a selected time range is maintained. In some embodiments, the time range selector may further include a heat map that can quickly inform a user of important (e.g., critical) time units within the range of time.

According to various embodiments, an interactive hierarchical bar chart is provided and is capable of representing data items and hierarchical attributes of the data items in a clear and concise visual manner. The interactive bar chart can be displayed via the user interface in combination with the time range selector or it can be a stand-alone visual component displayed by the software/system herein. For example, the interactive bar chart can be displayed along an axis of the user interface (e.g., X axis, Y axis, Z axis, etc.) and can be used to represent items or groups of items from within a time period selected via the time range selector. The interactive bar chart combines direct manipulation behavior with data visualization to aggregate and disaggregate a high volume of data via an in-place drill down view that provides high efficiency of use without requiring a complex combination of user controls such as filters or the like. The interactive bar chart can break down a larger group of items into smaller groups, in a step-by-step drill down process which can be used to guide a user through a decision making process.

In some embodiments, the software that is used to generate and process the visual components and the user interface described herein may be part of an allocation management software for use in various industries such as retail services, computer animation, graphical layouts, hierarchical databases, and the like, however, it should be appreciated that the embodiments are not limited thereto. Hierarchical data can be distributed throughout thousands or even millions of database records. Each record may include multiple fields that have stored therein one or more values. Viewing this information in an efficient and comprehensive manner can be performed by the visual components provided herein thereby providing a viewer/user with a well-informed understanding of the data and its relationships with various rules and attributes.

As a non-limiting example, the user interface may provide a comprehensive view and insight of various characteristics and attributes of records stored in a database. For example, the user interface may provide a visualization of records that are hierarchically related to one another and also identify records that are more urgent of interest than the other records. For example, certain days may have more records to be addressed than others which can create certain hot spots or periods of time that require more work for the user than other times. The user can select a time frame having different segmentation periods (e.g., days, weeks, months, years, etc.) based on segmentation criteria which can be set via the user interface. In addition, other criteria may be used to determine what records to visualize, what attributes of each record to visualize, hierarchical attributes of the record to visualize, and the like.

FIG. 1 illustrates a computing environment 100 for accessing database records in accordance with an example embodiment. In this example, the environment 100 includes a database 110 that stores database records such as item data, attributes of the items, quantities, geographical location information, pricing, and the like. The database 110 may be a relational database which stores data via a hierarchical model, or the like. The database 110 may store records of items that have been or that need to be allocated to one or more locations. The environment 100 further includes a host server 120 that hosts and outputs the user interface including the visual components described herein. The host server may be a web server, a cloud platform, an on-premises device, and the like. In some embodiments, the host server 120 and the database 110 may be integrated together or coupled together, however, in this example, the host server and the database 110 connect with each other via a network connection.

Furthermore, the environment 100 includes a user device 130 capable of displaying a user interface (UI) that is hosted by the host server 120. For example, the user device 130 may connected to the user interface hosted by the host server 120 via a network connection (e.g., Internet, URI, URL, etc.) or it may connect via a private network, a cable, or the like. As another example, the user interface may be implemented via software stored locally on the user device 130. The user device 130 may include a laptop, a tablet, a smart phone, a desktop computer, a television, a smart-wearable device, a kiosk, or the like. According to various embodiments, the user device 130 may display a user interface which includes one or more of the visual components described herein and which is used to access data from the database 110 via the host server 120. The user device 130 can manipulate the user interface to modify the data records from the database 110 that are displayed under the control of the host server 120.

FIG. 2 illustrates an example of a user interface 200 (which may be referred to as a dashboard) that can be output by the host server 120 and displayed by the user device 130 shown in FIG. 1. In this example, control is embedded in a visual screen design of the user interface 200 that is based on a top to bottom structure, which guides users through a decision-making process and reduces a volume of work. The amount of data displayed within the user interface can be hierarchically drilled down into to expand a level of detail of the records and remove/collapse unselected record types and attributes from the screen. This is achieved by breaking down an amount of items step-by-step.

According to various embodiments, an interactive time range selector 210 can be used to select a range of time which is used to populate the other components of the user interface 200. In this example, the interactive time range selector 210 has a plurality of time units in a horizontal row including one row of data and a plurality of columns which form a bar of time which is referred to herein as a time bar. The time units can be manipulated via segmentation commands 214. For example, a granularity of the time units within the interactive time range selector 210 can be modified thereby changing a granularity with which a user can view records. The time range selector 210 also includes a pair of time selectors 211 and 212 which are referred to herein as grippers. The pair of time selectors 211 and 212 can traverse a time bar via commands entered through the user interface and can be used to specify a start of a desired time range and an end of a desired time range. The interactive time range selector 210 also includes a time range indicator 213 which visually indicates the units of time that are selected on the time bar through some sort of visually identifier such as shading, color, markings, signs, or the like.

The user interface 200 also includes an interactive bar chart 220 which displays a plurality of bars representing a plurality of items, which in this example correspond to a plurality of days that have been selected via the time range selector 210. Each bar can have a same height or it can have a dynamic height to identify information such as size, quantity, date, etc. The bars may also include shading (not shown in this example) which can be used to further provide data associated with the records. In the example of FIG. 2, the time range selector has been used to select five days (e.g., July $5^{th}$ thru July $9^{th}$). Each date may have a bar on the interactive bar chart 220, however, embodiments are not limited thereto. Also, the time unit selected from the time range selector 210 can dictate which bars are shown by the interactive bar chart 220. The interactive bar chart 220 also includes scroll commands 225 and 226 that enable a user to scroll horizontally to view other bars in either direction from the selected time range.

When a selection is made via the interactive bar chart 220 to select a bar 222 corresponding to the $6^{th}$ of July, the interactive bar chart 220 may collapse the remaining bars and launch an internal bar chart 223 which includes a plurality of additional bars 224 representing attributes of the item corresponding to the selected bar 222. For example, the additional bars may extend out from the selected bar 222 in a direction along the horizontal axis of the user interface thereby providing an in-place hierarchical drill down of the data via the interactive bar chart 220. That is, as a user opens additional bar charts the view of the interactive bar chart remains in place on the screen while the details are further drilled down into. As a non-limiting example, the additional bars 224 may represent records that are to be allocated on the selected date corresponding to the selected bar 222. Meanwhile, a tab bar 230 can provide additional information about the data shown in the interactive bar chart 220 and a table 240 can be used to visually show the data that is included within the database records (or a summary thereof) should a user desire to view significant details about each record. For example, the tab bar 230 can provide lifecycle information of records as they go through an allocation process.

Figure 3B:
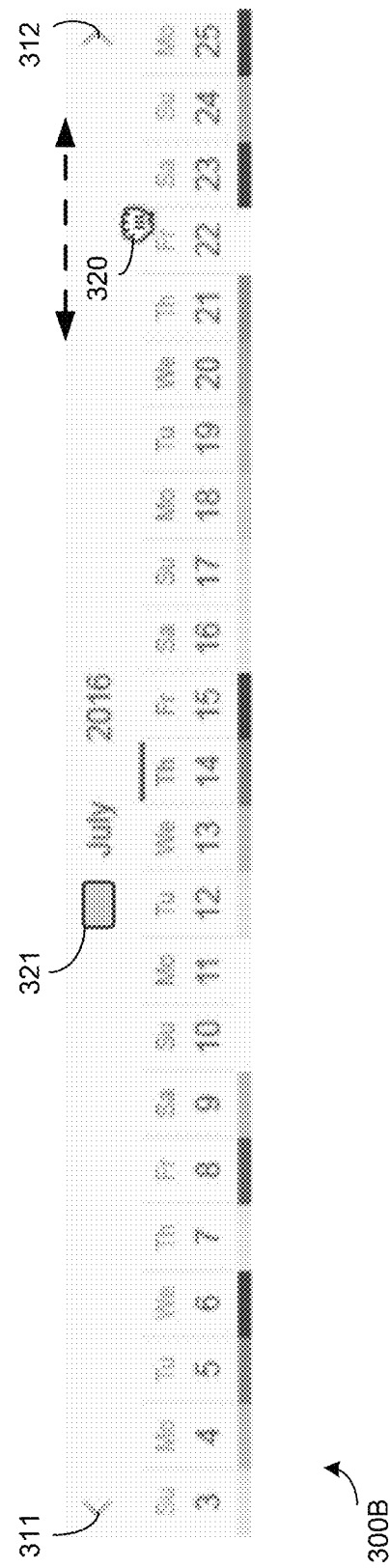

FIGS. 3A and 3B illustrate a time range selector which may be included in the user interface 200 shown in FIG. 2, in accordance with example embodiments. In these examples, the time range selector is positioned along a horizontal axis, but it may be positioned in a different orientation such as a vertical axis, or the like. Referring to FIG. 3A, time range selector 300A includes a time bar 301 that is arranged along a horizontal axis of a user interface and includes a row of time units 302. In this example, the time units 302 correspond to days but the embodiments are not limited thereto. The time range selector 300A also includes selectable time modification units such as month modifier 303 and year modifier 304. A user can select either of these modification units 303 and 304 (e.g., via a touch, mouse click, etc.) and change the display of time units on the time bar to a different day, week, month, and the like. Although not shown in FIG. 3A, the time range selector 300A may also include a back button or refresh button capable of automatically returning to a current date/time after the user has traversed the time range selector 300A to a future date or a past date. In the example of FIG. 3A, the present/current time unit 313 (Jul. 14, 2016) is shaded a different color than the other selected time units on the time bar 301.

The time range selector 300A also includes a pair of time selectors 305 and 306 which may be used to select a range of time from the time bar 301. Each of the time selectors 305 and 306 can be moved independently of one another in a left and right direction in this example along the time bar 301. Accordingly, a user may adjust the selected starting time of the time range independently from the selected ending time of the time range. As another example, the pair of time selectors 305 and 306 may also be moved simultaneously. In the example of FIG. 3, a selected time range visual indicator 310 is shown which can visually differentiate the selected time units on the time bar 301 from among the remaining unselected time units on the time bar 301. For example, the selected time range visual indicator 310 may include shading, color, highlighting, symbols, signs, or the like, which can be used to visually differentiate a time unit that has been selected from a time unit that remains unselected. In this example, a user may press and hold any part of the selected time range visual indicator 310 and drag the selected time range visual indicator 310 in left and/or right directions causing the pair of time selectors 305 and 306, as well as the selected time range, to move in a unified fashion along the time bar 301. For example, the user may select any of the highlighted portion of the selected time range visual indicator 310 and move the time range visual indicator 310 in a horizontal direction.

The time range selector 300A also includes a heat map 308 which may be displayed underneath or in association with (e.g., above, on the side, etc.) each time unit in the time bar 301. The heat map 308 can indicate a level of urgency or importance associated with a time unit thereby merging contextual data from an underlying database with the time range selector 300A. In the example of FIG. 3A, the darker the heat map 308 the more urgent or critical the time unit is to a user. For example, the heat map 308 may be used to indicate an amount of records that is yet to be allocated or addressed on a particular day, or the like. The heat map 308 may be shaded by the system based on a quantity of records to be allocated or addressed in comparison to a predetermined threshold that has been defined by a user.

FIG. 3B illustrates an example of scrolling the time bar in order to collapse time units on one end and expand time units on an opposite end. In this example, the time range selector 300B includes a scroll commands 311 and 312 which can be used to scroll the time bar in either direction horizontally. In addition, the user can scroll horizontally by performing a drag-and-drop operation 320 on the time range selector 300B. The horizontally scrolling may be performed prior to and after the pair of time selectors are launched. In the example of FIG. 3B, the time range selectors have not been launched. To launch the time range selectors (305 and 306 shown in FIG. 3A), the user may select a launch button 321. As another example, the time range selectors may be launched by default when the application loads or at any other time by another means such as a right click, or the like.

Figures 4A, 4B, 4C:
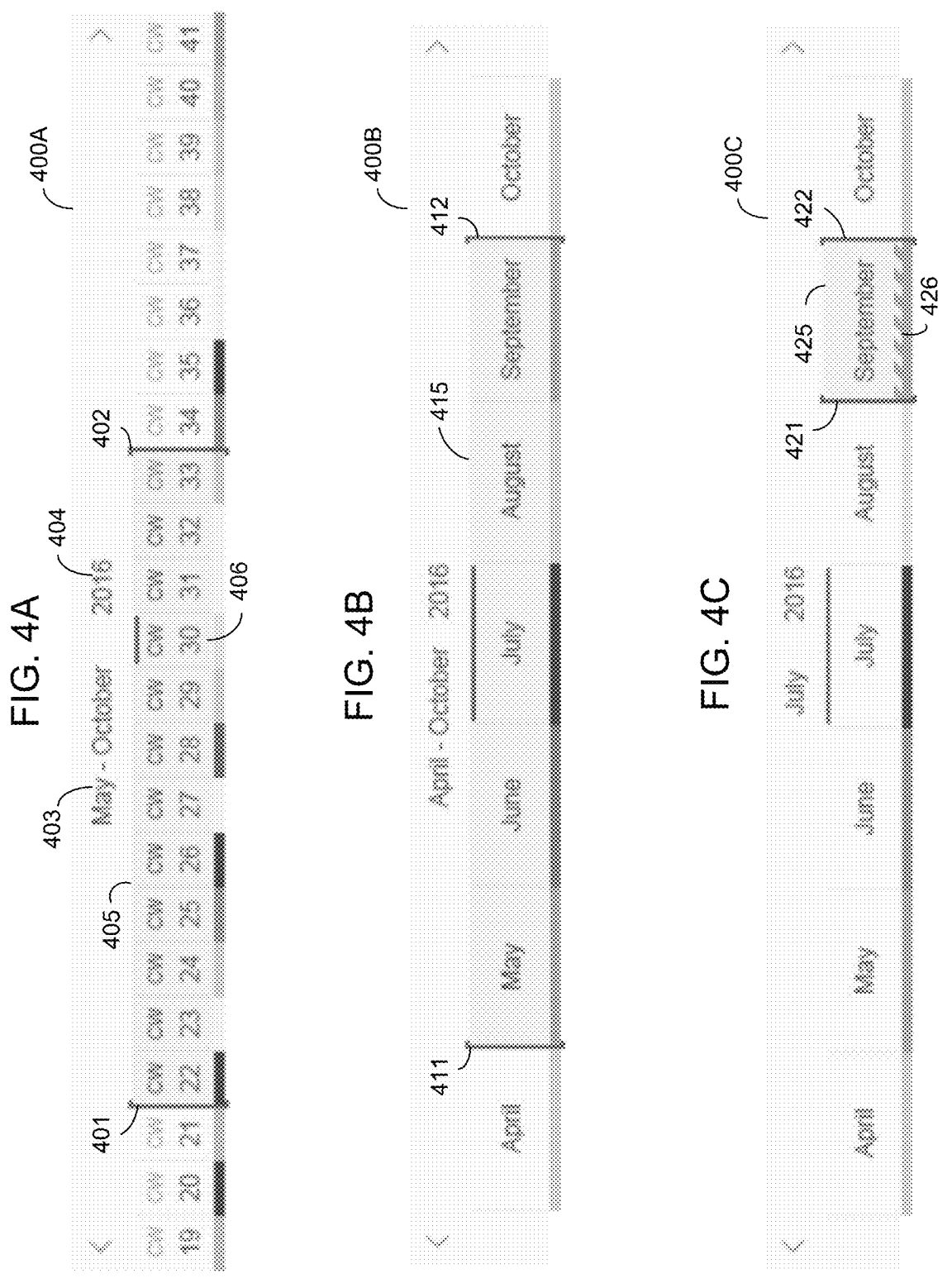
Figure 4D:
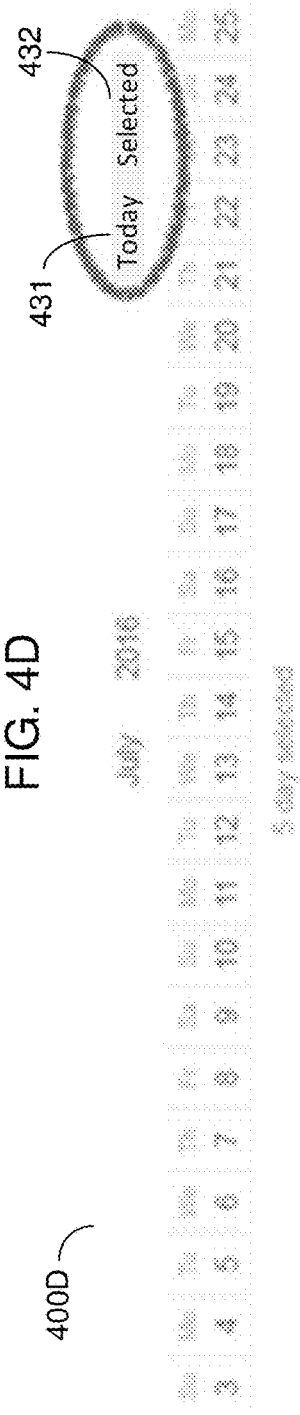
Figure 4E:
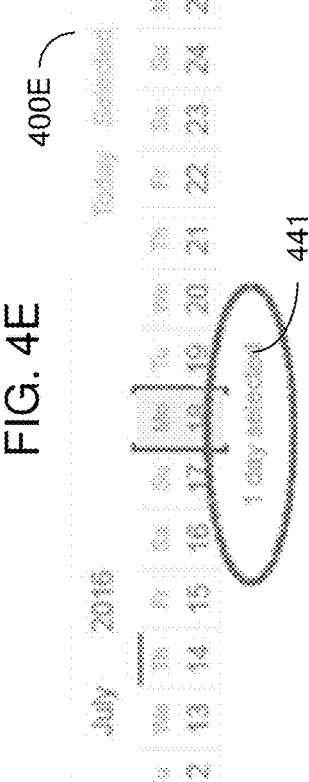
Figure 4F:
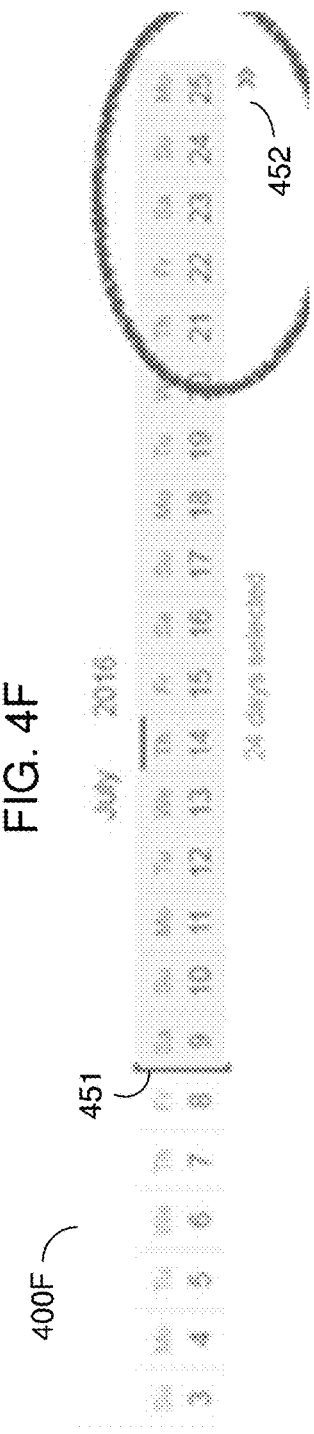

FIGS. 4A-4F illustrate features of the time range selector. For example, FIGS. 4A-4C illustrate examples of modifying a granularity of the time range selector in accordance with example embodiments, and FIGS. 4D-4F illustrate examples of navigation tools that may be included or implemented with the time range selector in accordance with example embodiments. Although the examples are shown separately in FIGS. 4A-4F for clarity and convenience, it should be appreciated that all (or one or more) of the features/components shown in FIGS. 4A-4F may be incorporated within a single time range selector. Referring to FIGS. 4A-4C, the granularity in these examples refers to the units of time that are displayed within the time bar. The user may increase the granularity (e.g., from weeks to days, etc.) and decrease the granularity (e.g., from weeks to months, etc.) by inputting commands via the time range selector. As one example, a calendar may pop-up or selectable options may pop-up in response to a user selection and a user may input a granularity via the calendar/options, however, the embodiments are not limited thereto.

In contrast with FIGS. 3A and 3B, in the example of FIG. 4A the granularity of the time units of time range selector 400A are shown as weeks not days. The granularity may be changed by selecting one of the modification units 403 and 404 which can be used to convert the time unit from hours, days, weeks, months, or the like, and which can be used to move the time shown within the time units back in time or ahead in time. For example, the user can change the granularity of the time unit by switching from days to weeks, and also change the dates of times shown by switching from April to May, or by switching from 2016 to 2017 via the modification units 403 and 404. In order to modify the granularity of the time units, a user may select one or more of the modification unit 403 or 404 and a calendar may pop-up (not shown). The user may then click on a selection of an option for any of an hourly view, a daily view, a weekly view, a monthly view, a yearly view, or the like.

In the example of FIG. 4A, the user has selected a range of twelve weeks using a pair of time selectors 401 and 402 positioned at different positions on the time bar of the time range selector 400A. The pair of time selectors 401 and 402 may be used in this example to selected a start week and an end week of a selected range of time as indicated by time selection visual indicator 405. Any weeks (time units) in between the weeks selected by the time selectors 401 and 402 may also be selected by the system. To indicate a current time unit (i.e., the current week), the time range selector 400A may highlight a current week using a visual indicator 406. FIG. 4B illustrates an example of time range selector 400B in which the time units have been modified or switched from weeks to months. For example, the user may transition from time range selector 400A shown in FIG. 4A to time range selector 400B shown in FIG. 4B by simply changing a time unit granularity setting. In this example, a pair of time selectors 411 and 412 are used to select five months of time as indicated by the time selection visual indicator 415.

FIG. 4C also illustrates an example of a time range selector 400C displaying a partial time selection indicator 426. In this example, a user has selected one week of time as a range of time. The selected week of time is encompassed by the month of September. However, the user has not selected all of the month of September. When the granularity of the time bar is changed from weeks to months, the time bar can only show time units of months. However, the user has selected a range of time that is smaller in granularity than the time units on the time bar. In this example, the time range selector 400C may display the partial time selection indicator 426 on the time unit 425 which encompasses the previously selected range of time. Also, a pair of time selectors 421 and 422 may be used to indicate that the selected range of time is within the month of September while the partial time selectin indicator visually indicates that the selected range of time does not include the entire month of September.

The time range selector may retain a selected range of time when the user switches time units on the calendar. The time range selector enables a user to move fluidly between granularity and length. The time range selector also provides multiple methods of moving left and right, dragging, clicking, etc. For example, a user can make day-by-day adjustments by simple clicking or the user can make whole weeks/months changes by dragging/scrolling in horizontal direction. The time selectors may be shaped like brackets. Via the time selectors, a user can grab either side and move the brackets left and right to change (expand/contract) dates. As another option, the user can click and drag on a visual indicator middle area of the selected time range and drag the entire date range from left to right without changing a size of the date range. The user may also can click on a single week, day, months, etc., and the grippers will contract to that selection. To initially select a range of dates the user may input a single click. By single clicking on any date on the timeline you can set the grippers to that day. The user may also take the corners of the selection and drag and hold them to contract and expand the date range. The time range selector also offers the ability to jump between different granularities while the days previously selected remain selected. The time range selector may display a visual indicator underneath (e.g., a dashed bar) showing a partial selection of the underlying time range.

Referring to FIG. 4D, time range selector 400D includes a plurality of quick links (e.g., shortcuts) which include a today link 431 and a selected link 432. The quick links may be used to navigate to other positions within the time range selector 400D which are not presently shown or which are partially shown via the user interface via a single click or selection. For example, the today link 431 may provide a shortcut to a positional view on the time range selector 400D of a current day (with respect to current/actual time). As another example, the selected link 432 may provide a shortcut to a positional view in the center of the data range selected by the user via the user interface (e.g., via the grippers). Each shortcut 431 and 432 may be made visible in case the date range shown via the time range selector 400D does not contain the current day or the selected date range 432 thereby enabling the user to quickly navigate back to those date positions within the time range selector 400D.

Referring to FIG. 4E, time range selector 400E includes a number of units indicator label 441 which indicates a number of time units (in this case days) which have been selected. The time units may changes based on settings (e.g., hours, days, weeks, months, etc.) The number of units indicator label 441 allows the viewer to quickly understand the current selection range. Meanwhile, referring to FIG. 4F, time range selector 400F includes a first date selected via a first gripper 451, but does not have room on the screen to show an end date which has also been selected via a second gripper (not shown). In this example, a hidden date range indicator 452 may be displayed to indicate that the selected date range is not fully visible. In this example, it is the end point which is not visible, however, it may be the start point, or both the start point and the end point as well. Therefore, another hidden date range indicator may be shown on the other side of the time range selector 400F when appropriate. The hidden date range indicator 452 provides a notification to the user that the selected date range continues beyond what is shown and may also server as a shortcut to move the view point of the time range selector to the end of the selected date range (or beginning) thereby allowing the user to easily adjust the selection.

Figure 5:
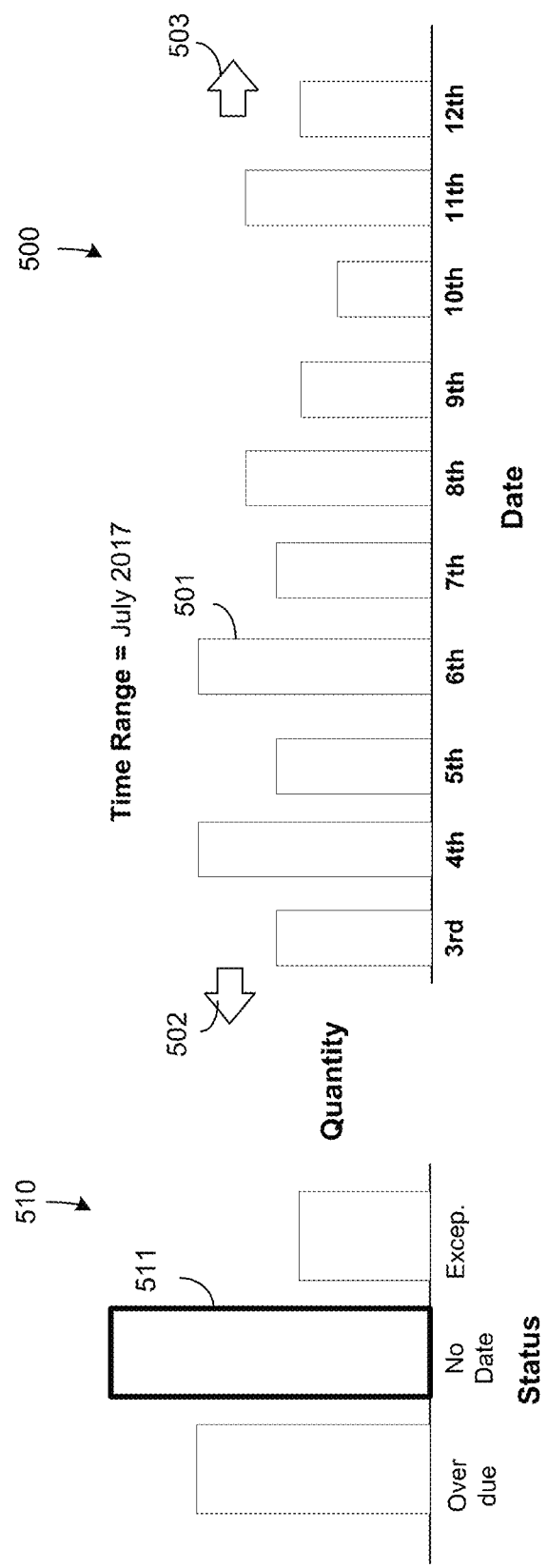
FIG. 5 is a diagram illustrating a first display level of an interactive bar chart in accordance with an example embodiment.
Figure 6C:
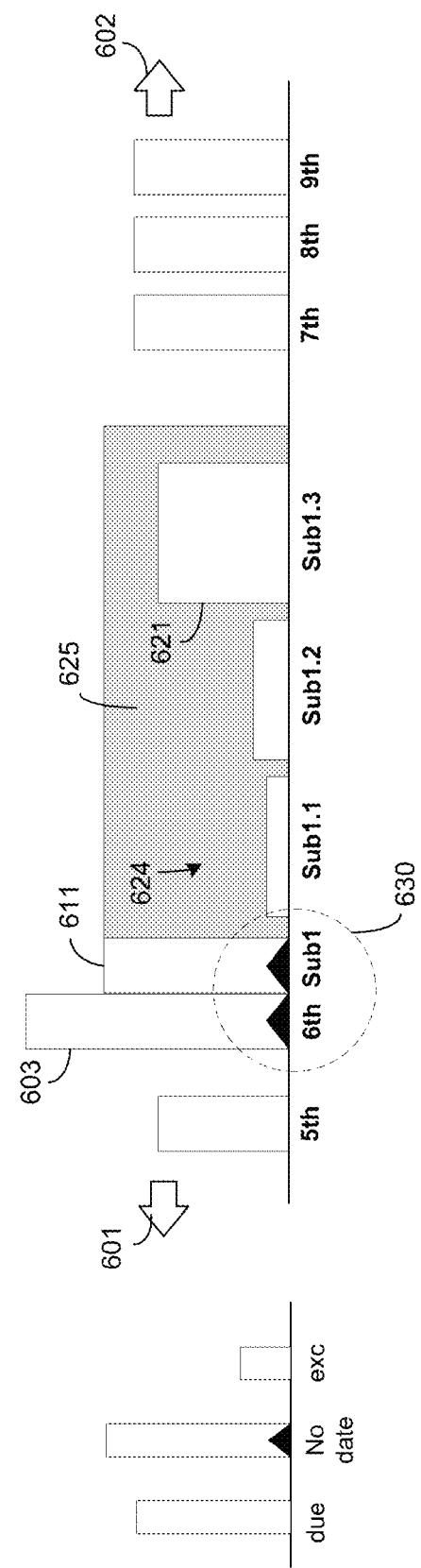

FIG. 5 illustrates an initial display level of an interactive bar chart in accordance with an example embodiment, and FIGS. 6A-6C illustrate views of the interactive bar chart during a drill down operation in accordance with example embodiments. Referring to FIG. 5, interactive bar chart 500 provides a visual mechanism that can perform a drill down into hierarchical data while a view of the user interface remains in-place. The interactive bar chart 500 includes a plurality of bars 501 which correspond to a plurality of dates. The bars 501 in this example are used to visually represent a quantity of product (e.g., a numerical amount), however, it should be appreciated that the bars 501 may be used to visualize any value or attribute that is capable of being represented with a bar. In these examples, the bars 501 are positioned along a horizontal axis, but it may be positioned in a different orientation such as a vertical axis, or the like.

The interactive bar chart 500 also includes a left scroll button 502 and a right scroll button 503 that enables a user to collapse/expand the bars 501 being displayed when there are more bars than what is shown on the user interface. The user interface may also include a status bar chart 510 which can be used to populate the interactive bar chart 500, however, embodiments are not limited thereto. In this non-limiting example, the interactive bar chart 500 is populated by a selection of bar 511 from status bar chart 510 which represents the products that need to be allocated and which have not received a shipping date.

Referring to FIG. 5 and FIG. 6A, when a user selects a bar from the first level of the interactive bar chart 500, the interactive bar chart 500 performs an in-place hierarchical drill down as shown in interactive bar chart 600A. The drill down provides an efficient visualization of numerous attributes (product, quantity, etc.) of a record or other item without using a complex combination of controls which are typically performed through manual settings by a user performing filtering operations. For example, the interactive bar chart 500 and 600A combines hierarchy navigation with bar chart visualization. The underlying data may be extracted from a database. For example, the underlying data may include thousands or even millions of data records (e.g., thousands of records on a daily basis). All of this data may be tracked in the database and fed in a specific format to the software. By clicking on a certain day, the system knows to identify all items for that day/week, etc. Also, the user can decide how granularly you want the system to break down the data. One of the benefits or unique aspects of the interactive bar chart 500 is combining hierarchy navigation with the visualization in a bar chart format rather than a numerical visualization via a spreadsheet.

In the example of FIG. 6A, the interactive bar chart 600A receives a selection of bar 603 and in response, collapses remaining unselected bars from the first level of the interactive bar chart and launches an internal bar chart 604. The internal bar chart 604 may launch/expand from a position beginning with a location of the selected bar 603 into a plurality of additional bars 611-614 based on hierarchical attributes of the item corresponding to the selected bar 603. In some embodiments, a visual indicator 605 may be displayed behind the additional bars 611-614 or otherwise in association with the selected bar 603 to provide a visual indication that the additional bars 611-614 are hierarchically dependent from the selected bar 603. For example, the visual indicator 605 may include a colored background pane, shading, one or more lines, or the like, which can be used to visually differentiate the additional bars 611-614 from the other bars on the interactive bar chart 600A. The collapsing of the remaining bars may cause scroll buttons 601 and 602 to be displayed thereby enabling the user to scroll back and forth to bars that have been hidden as a result of the launching of the internal bar chart 604.

The internal bar chart 604 may display the plurality of additional bars 611-614 that correspond to a plurality of attributes of the item corresponding to selected bar 603. The attributes may be hierarchically dependent on the item. As a non-limiting example, the item corresponding to selected bar 603 may be a quantity of pants that need to be allocated on July $6^{th}$, and the internal bar chart 604 may display a plurality of additional bars that represent different colors of the pants that are to be allocated thereby further breaking down the quantity of pants by color (or some other attribute).

In the example of FIG. 6A, the bar corresponding to July $6^{th}$ is selected which is indicated by selection marker 610. Meanwhile, the remaining bars corresponding to July 3-July 5, and July 7-July 12 may be collapsed or partially collapsed to make room for the plurality of additional bars 611-614 within a viewing area of the interactive bar chart 600A. By collapsing the unselected bars, the viewing position of the interactive bar chart 600A remains in one common place on the screen while the other areas are moved outward. During the collapsing process, some or all of the unselected bars may be removed from the viewing area, however, this is not a requirement. As another example or in addition, the bars may be reduced in size, moved to another part on the screen, or the like. FIG. 6B illustrates another example of the interactive bar chart 600B which includes shading 650 which may be used to provide a visual indicator of an additional contextual attribute, for example, an amount of progress that is being made on the selected date, etc. The shading can be darker or lighter colors and contrast than the remaining areas of the bars. That is, within each bar there may be one or more shadings of colors that can be used to indicate an additional attribute of the item such as how much of the item has been processed/allocated and how much still needs to be processed.

FIG. 6C illustrates a second selection being made via the interactive bar chart which in this example causes interactive bar chart 600C to collapse the additional bars 611-614 shown in FIG. 6B by removing them from the screen and launch a second internal bar chart 624 in response to additional bar 611 being selected from interactive bar chart 600B shown in FIG. 6B. The second internal bar chart 624 includes a second plurality of additional bars 621 corresponding to sub attributes of the attribute corresponding to selected additional bar 611. As a non-limiting example, continuing with the pants scenario, the selected additional bar 611 may correspond to pants having the color khaki. Meanwhile, the additional bars of the second internal bar chart 624 may further break down khaki pants into different sizes such as small, medium, and large, or the like. Accordingly, when an additional bar from the internal bar chart 604 is selected, an additional internal bar chart 624 is launched including a second plurality of additional bars having a hierarchical relationship to the attribute selected. This process may continue until there are no more levels of data attributes to dive into via the interactive bar chart.

In the examples of FIGS. 6A-6C, the interactive bar chart expands in a horizontal direction rather than a hierarchical drop down such as in a traditional hierarchical chart. Furthermore, selecting a bar triggers a drill down to a next hierarchical level of detail. In some embodiments, the interactive bar chart 600C may display breadcrumb navigation 630 information which identifies a trail of the bars which have been selected via the current drill down session. In the example of FIG. 6C, the breadcrumb navigation illustrates the bar 603 (FIG. 6A) and the additional bar 611 (FIG. 6C) as well as the order they were selected in which starting from left to right. Furthermore, a visual indicator 625 may be displayed behind the second internal bar chart 624 which indicates that the second internal bar chart 624 is associated with the selected additional bar 611.

FIG. 7A illustrates an example of a scrolling operation that may be performed from within an internal bar chart 710 of an interactive bar chart 700A. In this example, the selected bar has more attributes than can be displayed on the screen which in this example can hold nine attributes (i.e., nine bars). The interactive bar chart 700A may display scroll commands 711 and 712 within a visual indicator of the internal bar chart. By manipulating these commands, a user may scroll in either direction to view bars/attributes that are not initially shown. For example, the scrolling command may be like a dial in which the last attribute is followed by the first attribute like when turning a wheel. As another example, the last attribute may be a hard stop requiring the user to select the scroll command going the other way to return back to the previously viewed bars.

FIG. 7B illustrates an example of a zoom operation that may be performed within an internal bar chart 720 of an interactive bar chart 700B. In this example, the interactive bar chart 700B can detect a position of a cursor 730 on the screen and zoom in on one or more bars within the interactive bar chart 700B such as bar 721 within the internal bar chart 720. In addition, even though the cursor 730 is not positioned directly over adjacent bar 723, the interactive bar chart 700B may zoom in partially on the adjacent bar 723. By zooming in, the interactive bar chart 700B can provide a better view or a magnified view of the details within the bar 721.

FIG. 8 illustrates a method 800 of managing an interactive bar chart in accordance with an example embodiment. The method 800 may be performed by a computing device such as a web server, an on-premises device, a cloud platform, a user device, a kiosk, a television, and the like. For example, the method 800 may be performed by the host server 120 shown in FIG. 1. Referring to FIG. 8, in 810, the method includes displaying, via a user interface, an interactive bar chart which includes a plurality of bars representing a plurality of items, respectively. For example, the plurality of bars may be vertical bars arranged along a horizontal axis of the user interface. As another example, the plurality of bars may be horizontal bars arranged along a vertical axis, or the like. In some embodiments, the bars may each represent an item such as a unit of time, a product, an attribute of a product, a database record, or the like.

In 820, the method includes detecting a selection of a bar from among the plurality of bars corresponding to an item from among the plurality of items. For example, the interactive bar chart can be manipulated by user inputs such as touches on a touch screen, mouse clicks, keyboard selections, vocal commands, motion gestures, and the like. In response to the bar being selected, in 830 the method may include collapsing a horizontal display of remaining bars from among the plurality bars corresponding to unselected items from among the plurality of items, and in 840, launching an internal bar chart visually associated with the selected bar and comprising a plurality of additional bars representing a plurality of hierarchical attributes of the corresponding item, respectively. For example, a size of one or more the remaining bars within the initial interactive bar chart that are not selected may be reduced horizontally and/or vertically. As another example, a number of the remaining bars may be reduced by removing one or more of the remaining bars from being displayed on the user interface. By collapsing the remaining bars, the internal bar chart can be launched in-place where the bar of the interactive bar chart is selected.

According to various embodiments, the launching of the internal bar chart may include initiating a display of the plurality of additional bars of the internal bar chart beginning at a horizontal position of the selected bar from among the plurality of bars and extending in a direction away from the selected bar along the horizontal axis of the user interface. In this example, the selected bar may remain where it is located on the horizontal axis or it may be shifted in either direction (e.g., a left direction) to make more room for the additional bars included in the internal bar chart. To further illustrate that the internal bar chart is associated with the selected bar, the method may further include displaying a background pane within the user interface behind the additional bars included in the internal bar chart which visually indicates that the internal bar chart is associated with the selected bar. The background pane may be a different color or a different shade than the rest of the user interface to further highlight a display of the background pane.

Selections may continue to be made on the interactive bar chart at levels and sub-levels therein thereby further drilling down into attributes and sub attributes of the initially selected item. Each time a bar from within an internal bar chart is selected, a next hierarchical bar chart can be launched in-place. For example, the method further include detecting a selection of an additional bar within the internal bar chart corresponding to a hierarchical attribute of the item from among the plurality of attributes, and launching a second internal bar chart visually associated with the selected additional bar and including a plurality of second additional bars representing a plurality of hierarchical sub-attributes of the corresponding attribute, respectively. In some embodiments, the method may further include displaying breadcrumb navigation visually indicating a selection sequence of the selected bar and the selected additional bar made via the user interface. For example, the breadcrumb navigation may be the selected bars or other indicators notifying of the selected bars.

In some embodiments, the method may include detecting a cursor position with respect to the internal bar chart, and zooming in on a view of an additional bar within the internal bar chart that is closest in position to the detected cursor position. As another example, in some embodiments the method may further include performing horizontal scrolling within the internal bar chart based on a selection. The horizontal scrolling may be performed when there are too many bars that do not all fit within the user interface. By scrolling, the bars may be collapsed at one end of the bar chart and one or more additional bars not being displayed initially may be displayed at the other end of the bar chart.

FIG. 9 illustrates a method 900 of managing a time range selector in accordance with an example embodiment. The method 900 may be performed by a computing device such as a web server, an on-premises device, a cloud platform, a user device, a kiosk, a television, and the like. For example, the method 900 may be performed by the host server 120 shown in FIG. 1. Referring to FIG. 9, in 910, the method includes displaying, via a user interface, a time bar which may include at least one row of time units arranged in chronological order from one end of the time bar to another. In the examples herein, the time bar includes a single row with multiple time units in the row. As another example, the time bar may include multiple rows and columns. The time units may be seconds, minutes, hours, days, weeks, months, years, or the like. The granularity of time is not limited. Furthermore, even though the example provides a horizontally displayed time bar, the time bar may be vertical including one or more columns of time units. The user interface may also provide a selection or other command that enables a user to adjust the granularity of time shown in the time bar via a single command or request via the user interface.

In 910, the method includes displaying a pair of time selectors at separate positions on the time bar, each of the time selectors being independently movable on the time bar with respect to one another. The time selectors may be shapes or symbols such as a bracket or a gripper as shown in some of the examples herein. As another example, the time selector may be a highlighting of the time unit with a shading or a color. As another example, the time selector may be a change in font, change in background, or the like of a time unit. That is, the time selectors may have different shapes, sizes, and forms. The time selectors may be manipulated by a user operation such as a point and click, drag and drop, voice command, touch command, and the like. The first time selector may be positioned on or otherwise in contact with (e.g., at an outside edge, top, bottom, side, etc.) a first time unit and the second time selector may be positioned on or otherwise in contact with a second time unit.

In 930, the method includes selecting a range of time from the time bar based on the time units that are included on the time bar between the positions of the pair of time selectors. For example, if the first time selector is positioned on a first time unit, and a second time selector is positioned on a fourth time unit, the selecting may include selecting the first time unit and the fourth time unit, and also selecting second and third time units chronologically positioned between the selected first and fourth time units on the time bar. In 940, the method further includes processing an operation of a computing system based on the selected range of time on the time bar between the positions of the pair of time selectors. For example, the selected time range may be used to populate the interactive bar chart described herein based on data records from an underlying database, and the like.

In some embodiments, the method may further include receiving a drag-and-drop operation which selects a first time selector from among the pair of time selectors, and in response, moving the selected first time selector along the time bar according to the drag-and-drop operation received. For example, the time selector may be slide along the time bar based on the drag-and-drop operation and set to a time unit at a location at which the time selector is released. By moving the time selector, the user can change the range of time that is being selected. For example, moving the first time selector from the pair can change a starting time unit selected on the time bar. Likewise, moving the second time selector from the pair can change an end time on the time bar. The start time and the end times refer to the start of the time range and the end of the time range being selected. When one of the time selectors is moved on the time bar via a drag-and-drop operation, the other time selector from among the pair of time selectors may not move but rather may maintain a position on the time bar.

In some embodiments, the method may further include displaying a selected time range visual indicator that visually identifies the time units on the time bar that have been selected by the pair of time selectors. For example, the selected time range visual indicator may be a colored background pane or shaded background pane that is positioned on the time units that have been selected on the time bar. In some embodiments, the method may further include receiving a drag-and-drop operation on the selected time range visual indicator, and uniformly modifying a position of both of the time selectors on the time bar in response to receiving the drag-and-drop operation on the selected time range visual indicator. In other words, by clicking on any portion of the selected time range visual indicator and performing a drag-and-drop operation, the user can simultaneously move both of the pair of time selectors along the time bar.

In some embodiments, the method may further may include displaying a heat map with each time unit on the time bar, each heat map dynamically indicating a level of urgency associated with a respective time unit. The heat map may be used to represent contextual data stored in a database accessed by the application. In some embodiments, the user interface may also provide a means by which a user can change the granularity of the time units, for example, change from a time unit of days to a time unit of weeks. In this example, when the time unit granularity is changed, a selected time range may be maintained even though the granularity is different. When the selected time range only occupies a part of a changed time unit granularity, the method may further include displaying a partial time selection indicator on a modified time unit of the modified time bar. For example, when a selected time range is three days, and the granularity is changed from days to weeks, the time range only encompasses 3 days out of the 7 days of the selected week. Therefore, the system can display a partial time selection indicator on the week to indicate that only part of the week is actually selected. Furthermore, the user may select the week and drill down to view what days have been selected within the week.

Figure 10:
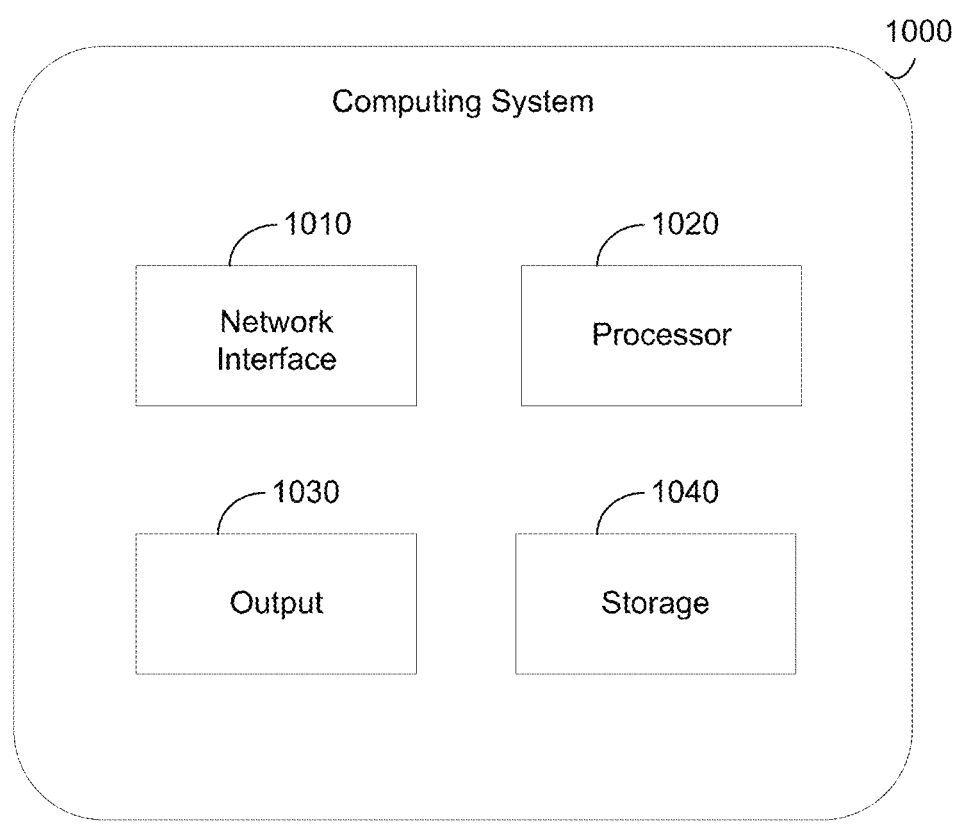
FIG. 10 is a diagram illustrating a computing system in accordance with an example embodiment.

FIG. 10 illustrates a computing system 1000 that can generate and manage the dashboard described herein including the time range selector and the interactive bar chart, in accordance with an example embodiment. For example, the computing system 1000 may be a web server, a database, a cloud platform, a user device, a server, or the like. In some embodiments, the computing system 1000 may be distributed across multiple devices. Referring to FIG. 10, the computing system 1000 includes a network interface 1010, a processor 1020, an output 1030, and a storage device 1040 such as a memory. Although not shown in FIG. 10, the computing system 1000 may also include or be electronically connected to other components such as a display, an input unit, a receiver, a transmitter, and the like. The processor 1020 may control the other components of the computing system 1000.

The network interface 1010 may transmit and receive data over a network such as the Internet, a private network, a public network, an enterprise network, and the like. The network interface 1010 may be a wireless interface, a wired interface, or a combination thereof. The processor 1020 may include one or more processing devices each including one or more processing cores. In some examples, the processor 1020 is a multicore processor or a plurality of multicore processors. Also, the processor 1020 may be fixed or it may be reconfigurable. The output 1030 may output data to an embedded display of the computing system 1000, an externally connected display, a display connected to the cloud, another device, and the like. The storage device 1040 is not limited to a particular storage device and may include any known memory device such as RAM, ROM, hard disk, and the like, and may or may not be included within the cloud environment. The storage 1040 may store software modules or other instructions which can be executed by the processor 1020 to perform the method 800 shown in FIG. 8 or the method 900 shown in FIG. 9.

According to various embodiments, the output 1030 may output a user interface including visual components that are described herein. For example, the processor 1020 may control the output to display, via the user interface, an interactive bar chart including a plurality of bars representing a plurality of items, respectively. For example, the plurality of bars may be arranged along an axis such as a horizontal axis, a vertical axis, a Z-axis, or the like, of the user interface. The processor 1020 may detect a selection of a bar from among the plurality of bars corresponding to an item from among the plurality of items. The bar may be selected by a user input via the user interface. In response to the bar being selected, the processor 1020 may collapse a horizontal display of remaining bars from among the plurality bars corresponding to unselected items from among the plurality of items, and launch an internal bar chart visually associated with the selected bar and comprising a plurality of additional bars representing a plurality of hierarchical attributes of the corresponding item, respectively. For example, the processor 1020 may collapse a horizontal display of the remaining bars by reducing at least one of a size and a number of the remaining bars being displayed within the interactive bar chart.

In some embodiments, the processor 1020 may initiate a display of the plurality of additional bars of the internal bar chart beginning at a horizontal position of the selected bar from among the plurality of bars and extending away from the selected bar along the horizontal axis of the user interface. In some embodiments, the processor 1020 may display a background pane within the user interface behind the internal bar chart which visually indicates that the internal bar chart is associated with the selected bar. In some embodiments, the processor 1020 may further detect a selection of an additional bar within the internal bar chart corresponding to a hierarchical attribute of the item from among the plurality of attributes, and launch a second internal bar chart visually associated with the selected additional bar and including a plurality of second additional bars representing a plurality of hierarchical sub-attributes of the corresponding attribute, respectively.

To assist the user in visualizing what selections they have made, the processor 1020 may display breadcrumb navigation visually indicating a selection sequence of the selected bar and the selected additional bar made via the user interface. In some embodiments, the processor 1020 may further detect a cursor position with respect to the internal bar chart, and zoom in on a view of one or more bars in the interactive bar chart or additional bar within the internal bar chart that are closest in position to the detected cursor position. There are situations where the amount of bars (or additional bars) may be greater than what can be shown within the user interface. In this example, the processor 1020 may display scroll buttons or inputs which when selected perform horizontal scrolling within the internal bar chart based on a selection. For example, the horizontal scrolling may expand a display of the internal bar chart at one end to display one or more additional bars not being displayed initially and collapse a display of the internal bar chart at another end to remove one or more additional bars such that they are no longer displayed.

In another example embodiment, the output 1030 may display, via a user interface, a time bar which includes one or more rows or columns of time units arranged in chronological order from one end of the time bar to another. Furthermore, the processor 1020 may control the output 1030 to display a pair of time selectors at separate positions on the time bar and each time selector may be independently movable on the time bar with respect to one another. According to various embodiments, the processor 1020 may select a range of time from the time bar based on one or more time units that are included on the time bar between the positions of the pair of time selectors, and process an operation based on the selected range of time on the time bar between the positions of the pair of time selectors. The time units may have varying granularity such as seconds, minutes, hours, days, weeks, months, years, and the like. In some embodiments, the processor 1020 may display a heat map with each time unit on the time bar which indicates a level of urgency associated with a respective time unit. For example, the darker the time unit the greater the urgency, and the like.

The time selectors may be positioned at one or more default spots on the time bar when the time range selector is initiated. In some examples, the pair of time selectors may be moved individually or the pair of time selectors may be moved at the same time. For example, the processor 1020 may detect a drag-and-drop operation of a first time selector from among the pair of time selectors, and in response, move the first time selector along the time bar according to the drag-and-drop operation received. In this example, a second time selector from among the pair of time selectors may not be moved in response to the first time selector being moved via the drag-and-drop operation. In some embodiments, the processor 1020 may display a selected time range visual indicator that visually identifies the time units on the time bar that have been selected by the pair of time selectors. The selected time range visual indicator may be a pane, banner, shading, etc. which is shown in a background of the selected time units on the time bar such that the units of time can still be visualized. In this example, the processor 1020 may detect a drag-and-drop operation on the selected time range visual indicator, and uniformly modify a position of both of the time selectors simultaneously on the time bar in response to receiving the drag-and-drop operation on the selected time range visual indicator.

In some embodiments, the processor 1020 may modify a granularity of the time bar, in response to receive a command via the user interface. For example, the processor 1020 may modify the time units from days to weeks, weeks to months, months to days, and the like. The modification may not affect a time range that has been selected. In other words, the processor 1020 may maintain a selected time range when the granularity is modified. When the granularity is too large to specify a specific start time and end time, the processor 1020 may display a partial time selection indicator on a modified time unit of the modified time bar when the granularity is increased and the modified time unit encompasses the selected time range and also encompasses additional time not selected.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs))

used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   an output configured to display, via a user interface, a time bar comprising a row of time units arranged in sequential order from one end of the time bar to another, and display a pair of time selectors at separate positions on the time bar which are independently movable on the time bar with respect to one another; and
   a processor configured to move at least one of the pair of time selectors on the time bar based on a user input, detect a change in a number of time units on the time bar that are selected by the pair of time selectors based on the movement, and populate data displayed in the user interface with content associated with data records based on the detected change in the number of time units,
   wherein the processor is further configured to display a row of heat maps adjacent to and aligned with the row of time units on the time bar, where each time unit on the time bar has its own respective heat map displayed underneath and independent of the respective time unit, and a first time selector from the pair is disposed on an outermost edge of a first selected time unit and an outermost edge of its corresponding heat map, and a second time selector from the pair is disposed on an outermost edge of a second selected time unit and an outermost edge of its corresponding heat map.

2. The computing system of claim 1, wherein the processor is further configured to detect a drag-and-drop operation of the first time selector, and in response, move the first time selector along the time bar and grip an outside edge of a different time unit according to the drag-and-drop operation received.

3. The computing system of claim 2, wherein the second time selector from among the pair of time selectors is not moved in response to the first time selector being moved via the drag-and-drop operation.

4. The computing system of claim 1, wherein the processor is further configured to display a selected time range visual indicator that fills in a background of each selected time unit with at least one of color and shading to visually identify each selected time unit on the time bar that has been selected by the pair of time selectors.

5. The computing system of claim 1, wherein the processor is further configured to detect a drag-and-drop operation on the selected time range visual indicator, and uniformly modify a position of both of the pair of time selectors on the time bar in response to receiving the drag-and-drop operation on the selected time range visual indicator.

6. The computing system of claim 1, wherein each time unit comprises at least one of an hour, a day, a week, a month, and a year, and the processor is further configured to modify a granularity of the time bar, in response to receive a command via the user interface.

7. The computing system of claim 6, wherein the processor is further configured to maintain the selected time range when the granularity of the time bar is modified through a user selection input via a modification menu.

8. The computing system of claim 7, wherein the processor is further configured to display a partial time selection indicator on a modified time unit of the modified time bar when the granularity is increased and the modified time unit encompasses the selected time range and also encompasses additional time not selected.

9. A computer-implemented method comprising:
   displaying, via a user interface, a time bar comprising a row of time units arranged in sequential order from one end of the time bar to another;
   displaying a pair of time selectors at separate positions on the time bar, each of the time selectors being independently movable on the time bar with respect to one another;
   moving at least one of the pair of time selectors on the time bar based on a user input and detecting a change in a number of time units on the time bar that are selected by the pair of time selectors based on the movement; and
   populating data displayed in the user interface with content associated with data records based on the detected change in the number of time units,
   wherein the displaying the time bar further comprises displaying a row of heat maps adjacent to and aligned with the row of time units on the time bar, where each time unit on the time bar has its own respective heat map displayed underneath and independent of the respective time unit, and a first time selector from the pair is disposed on an outermost edge of a first selected time unit and an outermost edge of its corresponding heat map, and a second time selector from the pair is disposed on an outermost edge of a second selected time unit and an outermost edge of its corresponding heat map.

10. The computer-implemented method of claim 9, further comprising receiving a drag-and-drop operation of the first time selector, and in response, moving the first time selector along the time bar and grip an outside edge of a different time unit according to the drag-and-drop operation received.

11. The computer-implemented method of claim 10, wherein the second time selector from among the pair of time selectors does not move in response to the first time selector being moved via the drag-and-drop operation.

12. The computer-implemented method of claim 9, further comprising displaying a selected time range visual indicator that fills in a background of each selected time unit with at least one of color and shading to visually identify each selected time unit on the time bar that has been selected by the pair of time selectors.

13. The computer-implemented method of claim 9, further comprising receiving a drag-and-drop operation on the selected time range visual indicator, and uniformly modifying a position of both of the pair of time selectors on the time bar in response to receiving the drag-and-drop operation on the selected time range visual indicator.

14. The computer-implemented method of claim 9, wherein each time unit comprises at least one of an hour, a day, a week, a month, and a year, and the method further comprises modifying a granularity of the time bar, in response to receive a command via the user interface.

15. The computer-implemented method of claim 14, further comprising maintaining the selected time range when the granularity of the time bar is modified through a user selection input via a modification menu.

16. The computer-implemented method of claim 15, further comprising displaying a partial time selection indicator on a modified time unit of the modified time bar when the granularity is increased and the modified time unit encompasses the selected time range and also encompasses additional time not selected.

17. A non-transitory computer-readable storage medium storing program instructions that when executed cause a processor to perform a method comprising:
displaying, via a user interface, a time bar comprising a row of time units arranged in sequential order from one end of the time bar to another;
displaying a pair of time selectors at separate positions on the time bar, each of the time selectors being independently movable on the time bar with respect to one another;
moving at least one of the pair of time selectors on the time bar based on a user input and detecting a change in a number of time units on the time bar that are selected by the pair of time selectors based on the movement; and
populating data displayed in the user interface with content associated with data records based on the detected change in the number of time units,
wherein the displaying the time bar further comprises displaying a row of heat maps adjacent to and aligned with the row of time units on the time bar, where each time unit on the time bar has its own respective heat map displayed underneath and independent of the respective time unit, and a first time selector from the pair is disposed on an outermost edge of a first selected time unit and an outermost edge of its corresponding heat map, and a second time selector from the pair is disposed on an outermost edge of a second selected time unit and an outermost edge of its corresponding heat map.

18. The non-transitory computer readable medium of claim 17, wherein the method further comprises receiving a drag-and-drop operation of the first time selector, and in response, moving the first time selector along the time bar and grip an outside edge of a different time unit according to the drag-and-drop operation received.

19. The computing system of claim 1, wherein the first and second time range selectors comprise opposing brackets which have a vertical width that extends above and below a vertical width of the time bar and the row of heat maps.

20. The computing system of claim 1, wherein the modifiable intensity of the heat map represents a dynamic amount of data records to be allocated at a future point in time.

21. The computing system of claim 1, wherein the processor is further configured to modify a granularity of the time units, select a changed granularity time unit which encompasses the selected time unit and additional unselected time, and display a partial selection visual element on the time bar that spans an entire bottom portion of the changed granularity time unit.

22. The computing system of claim 1, wherein the processor displays the plurality of heat maps as a bar of heat maps positioned underneath the time bar, and outermost edges of each respective heat map in the bar of heat maps are aligned with outermost edges of a respective time unit in the time bar.

* * * * *